United States Patent Office.

FERNANDO ESCOVAR, OF MEXICO, MEXICO.

ALTERATIVE TONIC.

SPECIFICATION forming part of Letters Patent No. 380,876, dated April 10, 1888.

Application filed January 31, 1888. Serial No. 262,567. (No specimens.) Patented in Mexico October 14, 1887.

*To all whom it may concern:*

Be it known that I, FERNANDO ESCOVAR, doctor of medicine, a citizen of the Republic of Mexico, residing at Mexico, in the Republic of Mexico, have invented a certain new and useful Improvement in Medical Compounds; and I do hereby declare the following to be a full, clear, and exact description of the invention, such as will enable others skilled in the art to which it appertains to make and use the same.

My invention relates to a medical compound having cleansing and tonic qualities; and it consists of the following ingredients, combined in the proportions stated: Simple sirup, five hundred grams; extract of sarsaparilla, eight grams; extract of dulcamara, eight grams; extract of saponaria, eight grams; iodoarseniate of iron, five centigrams; sulphate of morphia, seven centigrams; tincture of sassafras, forty-five grams. These ingredients are to be thoroughly mixed and administered in tea spoonful doses three or four times a day.

This compound is employed in the treatment of the following diseases: Skin diseases, liver and intestinal complaints, rheumatism, chlorosis, and ænemia. It also answers as an excellent appetizer and tonic.

What I claim, and desire to secure by Letters Patent, is—

The herein-described medical compound, consisting of simple sirup, extract of sarsaparilla, extract of dulcamara, extract of saponaria, iodoarseniate of iron, sulphate of morphia, and the tincture of sassafras, in the proportions herein specified.

In testimony whereof I affix my signature in presence of two witnesses.

FERNANDO ESCOVAR.

Witnesses:
JOSEPH SPYER,
JOHN WHITE.